United States Patent [19]
Johnson

[11] Patent Number: 5,294,337
[45] Date of Patent: Mar. 15, 1994

[54] WATER FILTRATION SYSTEM

[76] Inventor: Scott E. Johnson, 11427 Willet Ct. S., Jacksonville, Fla. 32225

[21] Appl. No.: 26,549

[22] Filed: Mar. 4, 1993

[51] Int. Cl.$^5$ .................. B01D 27/02; B01D 27/08
[52] U.S. Cl. .................. 210/266; 210/281; 210/283; 210/288; 210/503
[58] Field of Search .............. 210/266, 267, 281, 282, 210/283, 288, 435, 450, 488, 489, 503

[56] References Cited

U.S. PATENT DOCUMENTS

| | | | |
|---|---|---|---|
| 629,941 | 8/1899 | Wanner, Jr. | 210/281 |
| 1,450,054 | 3/1923 | Titus | 210/288 |
| 1,958,176 | 5/1934 | Zimmerman | 210/281 |
| 3,503,513 | 3/1970 | Kruzer et al. | 210/288 |
| 3,779,387 | 12/1973 | Day et al. | 210/232 |

*Primary Examiner*—Robert A. Dawson
*Assistant Examiner*—W. L. Walker
*Attorney, Agent, or Firm*—Thomas C. Saitta

[57] ABSTRACT

A water filtration system is disclosed for removing solid particulates from water, and in particular from storm water collection basins prior to passage into a storm water sewer system, comprising an ingress conduit to bring water into the system, a primary filter, a secondary filter of granular material, a primary filter carrier receptacle containing the primary filter which allows water to pass through but not the granules of the secondary filter, a collection conduit to remove the filtered water, and an access port connecting to the carrier receptacle which allows the primary filter to be removed from and returned to the carrier receptacle without disturbing the secondary filter. Preferably the system also comprises a rigid, water impermeable, closed housing. Alternatively, the housing may be constructed of a number of modular units joined together.

10 Claims, 2 Drawing Sheets

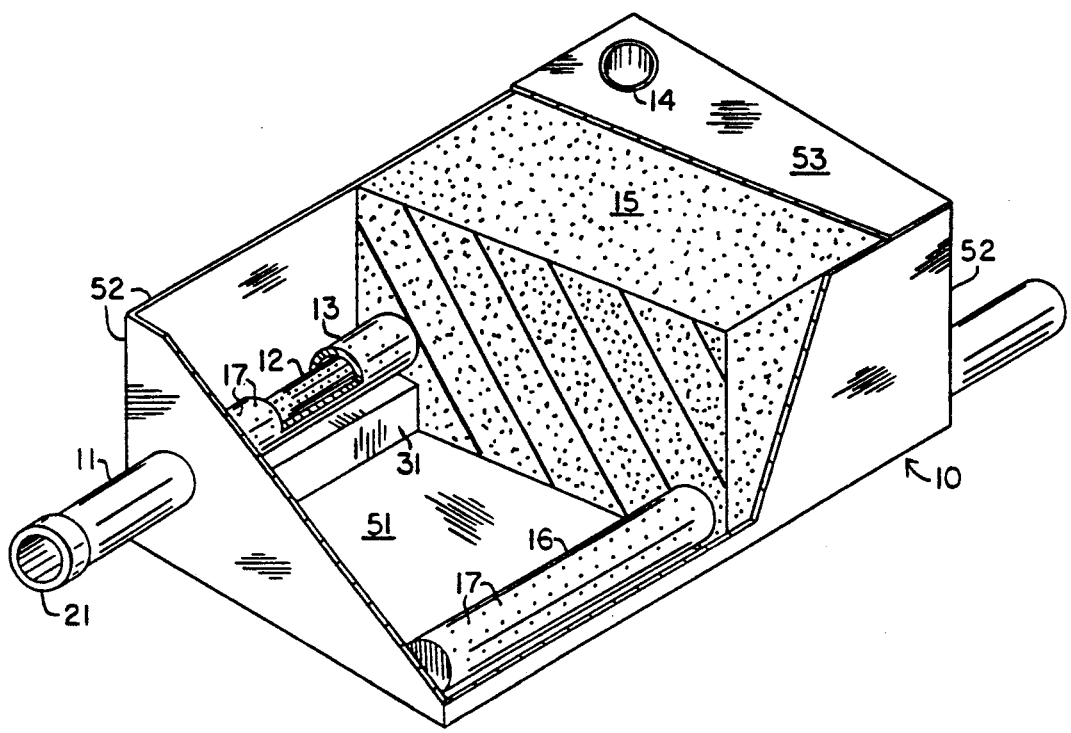
FIG. 4
FIG. 5
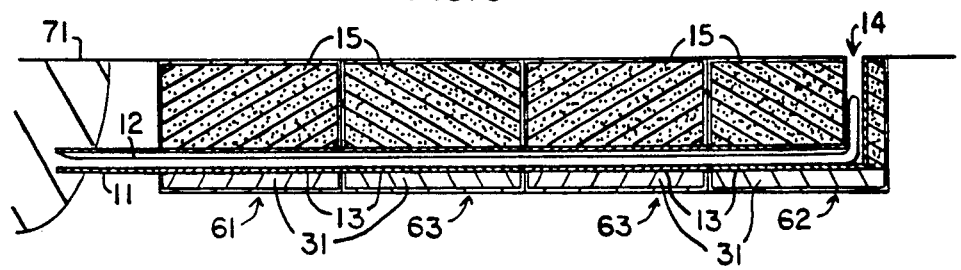

WATER FILTRATION SYSTEM

BACKGROUND OF THE INVENTION

The invention relates generally to water filtration systems used to remove solid contaminants and particulates from water. More particularly, the invention relates to such systems used with storm water run-off collection basins, where the water is filtered through a filter media to remove contaminants and particulates prior to its entry into the general storm sewer system. Even more particularly, the invention relates to such systems having a removable primary filter means for initial removal of contaminants and particulates, filter media such as sand interposed between the primary filter means and the collection means, and a primary filter carrier receptacle means for separation of the primary filter means from the filter media.

Where settlement is not a practical or effective method for separating solid contaminants and particulates from a liquid, filtration by passing the liquid through a suitable filter impermeable to the solid contaminants is the preferred alternative. Filters constructed of cloth, paper, metal, or other similar materials are used—the filters being designed to have effective opening sizes smaller than the particular contaminants to be removed from the liquid. Since the filter traps the solid contaminants against its wall or membrane, the filter will usually clog due to particulate build-up over time, resulting in the need to clean or replace the filter. In storm water run-off applications, the solid contaminants are typically removed using sand or soil as the filter medium. The water is brought into the sand filter medium from the retention basin, made to flow through the sand and is collected by a perforated collection pipe for transport into the storm sewer system. The spaces between the individual sand particles have an effective opening size which traps any particulates greater than that size. Like other filters, sand or soil will become clogged over time and must be replaced. This is labor intensive, costly and time consuming, with the job being made even more difficult since the sites are often accessible to heavy equipment only with great difficulty.

To increase the effective life of sand filter media in storm water applications, it is known to provide ingress conduits, such as for example perforated PVC pipe, which enable the water from the collection basin to flow into the filter media. The ingress conduits are typically wrapped with a filter fabric which acts as a primary barrier to trap a majority of the particulates prior to the liquid entering the sand filter medium. While this does increase the life of the sand filter medium, the filter fabric itself will clog over time and must be replaced. While this is an easier task than total removal of the sand, it still entails the use of heavy equipment to dig up and replace the ingress conduit and filter fabric sock.

It is an object of this invention to provide a water filtration system adapted for use with storm water run-off collection basins, the water filtration system acting to filter solid contaminants from the liquid to a level whereby the water can be passed into the general storm sewer system.

It is a further object to provide such system which utilizes the standard filtration methodology incorporating sand as a secondary filter along with a primary filter to accomplish initial separation of the vast majority of solid contaminants from the water.

It is a further object to provide such system which incorporates a permanent housing encompassing the system, with the primary filter means being constructed of a flexible material and contained within a primary filter carrier receptacle means, whereby the sand filter means is separated from the primary filter means.

It is a further object to provide such a system where the primary filter means is removable from the primary filter carrier receptacle means and from the housing itself, whereby the primary filter means can be easily replaced when it becomes clogged with solid contaminants.

It is a further object to provide such a system where the housing is pre-constructed in modular form, whereby a number of modules can be joined to create water filtration systems of differing capacity.

SUMMARY OF THE INVENTION

The invention is a water filtration system for removing solid contaminants from water, particularly adapted for use with storm water run-off collection basins where the water is to be filtered and then passed into the general storm sewer system. The water filtration system preferably comprises a housing for retaining the various components of the system, an ingress conduit connecting the basin to a primary filter carrier receptacle means within the housing, a primary filter means contained within the primary filter carrier receptacle means and the ingress conduit, an access port into the primary filter carrier receptacle means allowing access to the primary filter means, a collection conduit connected to the general storm sewer system to collect the filtered water and pass it into the storm sewer system, and a secondary filter means interposed between the primary filter carrier receptacle means and the collection conduit. The housing can also comprise a number of modular units adapted to be joined end-to-end to create a system of any length, where one housing module receives the ingress conduit, another contains the access port and the exit for the collection conduit, and the remainder contain segments of the carrier receptacle means and the collection conduit.

The secondary filter means is typically a granular material, preferably sand or activated charcoal, and the collection conduit and primary filter receptacle carrier means are perforated with openings of a size which allow water to pass through the collection conduit and primary filter carrier receptacle means but prevent the sand granules from passing through. The collection conduit and primary filter carrier receptacle means are preferably constructed of a rigid material, such as PVC or the like. The primary filter means is non-rigid and is preferably a perforated tube having one open end adapted to receive the particulate containing water from the collection basin at the end of the ingress conduit. The primary filter means extends through the primary filter carrier receptacle means to the access port. The primary filter may be constructed of any number of suitable materials, such as fabric or nonwoven cloth, and may be free standing or in the form of a sock encasing and supported by a flexible framework of pipe or wire. The primary filter means is designed with perforations or openings of effective opening size smaller than the diameter of the solid contaminants to be removed from the water. The water passes from the basin into the primary filter means, where most of the solid contaminants are removed, through the primary filter carrier receptacle means, through the secondary filter means to remove the remaining particulates, through the collection conduit and into the storm sewer system. When the primary filter mean loses effectiveness because of particulate clogging on its interior wall, the entire primary filter means is removed by disconnecting the open end from the ingress conduit and pulling it out of the primary filter carrier receptacle means and through the access port, or vice versa. The primary filter means can then be cleaned and replaced, or a substitute primary filter installed, by pulling it through the ingress conduit and into the primary filter carrier receptacle means, or vice versa, and reconnecting it to the open end of the ingress conduit. Thus the secondary filter means, the sand or activated charcoal, does not have to be disturbed.

BRIEF DESCRIPTION OF THE DRAWINGS

FIG. 4 is a perspective view of the invention as partially exposed.

FIG. 5 is a longitudinal cross-sectional side view similar to FIG. 2 showing a number of modular housing units.

DETAILED DESCRIPTION OF THE INVENTION

Figure 1:
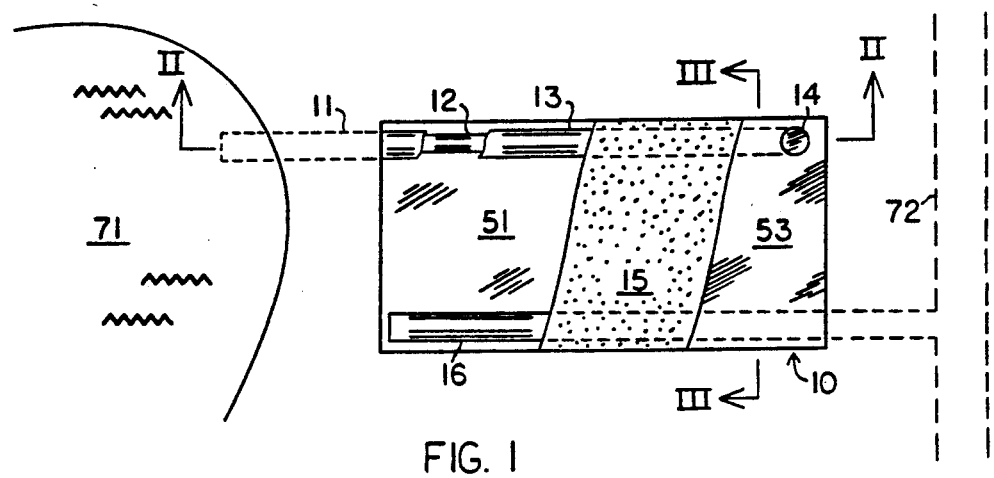
FIG. 1 is a vertical view showing the invention as partially exposed.

With reference now to the drawings, the preferred embodiment and best mode of the invention will now be set forth in detail. Referring to FIGS. 1 and 4, the overall configuration of the invention is best illustrated. The invention is a novel water filtration system for the removal of solid contaminants or particulates from the liquid, particularly adapted for filtering water from storm water run-off collection basins 71 prior to introduction into general storm sewer systems 72. In general, the invention comprises an ingress conduit 11 connecting the components of the system to the basin 71, a primary filter means 12 for separating the bulk of solid contaminants from the water, a primary filter carrier receptacle means 13 to contain the primary filter means 12, an access port 14 allowing access to the primary filter 12 in the carrier receptacle 13, a secondary filter means 15 such as sand or activated charcoal to further filter the water after it passes through the primary filter 12, and a collection conduit 16 to receive the filtered water and conduct it to the storm sewer system 72. Preferably, the components of the system are contained within or connected to housing means 10 comprising four sides 52, a top 53 and a bottom 51.

The system is adapted to be positioned below the ground surface at a depth such that water within a collection basin 71 can flow into the ingress conduit 11 and primary filter carrier receptacle 13 without necessity of pumping apparatus. The upper surface of the invention can be at ground surface level or below. Preferably, the main components of the system are contained in a rigid housing 10 comprising a liquid impermeable bottom member 51, top member 53 and side members 52 to fully encase the components of the system, constructed for example from HDPE or like material. However, a complete housing 10 is not a requirement for the functioning of the system, and the components can be placed into an excavation lined with water impermeable material if desired.

The system filters the water from the collection basin 71 using known non-pressure filtration principles which utilize gravity as the actuating means. In general, the water is brought into a typical system at a particular level and allowed to flow into and through filtering means. The removal means for the water is placed deeper than the ingress means such that a flow gradient or slope is created within the filtering means. In the invention, the ingress means are the ingress conduit 11, the primary filter 12 and carrier receptacle 13. The water flows through the secondary filter means 15. The removal means is the collection conduit 16, which is positioned at a greater depth than the ingress conduit 11 and carrier receptacle 13.

Water is brought into the system from the collection basin 71 by ingress conduit 11. Ingress conduit 11 extends short distance into the basin 71 and provides a conduit for the water to enter the primary filter 12 and primary filter carrier receptacle 13. Ingress conduit 11 is sized depending on the particular application and flow requirements, and may be constructed of any suitable material impermeable to water and sufficiently rigid to maintain an open channel when buried, such as 6 to 8 inch diameter PVC pipe for example. Ingress conduit 11 may be connected to housing 10 or directly connected to the carrier receptacle 13.

Primary filter carrier receptacle 13 is an open-ended, hollow, rigid member which creates a separation barrier between the primary filter means 12 and the secondary filter means 15. Carrier receptacle 13 is perforated with holes or slits to allow the water to pass through and into the secondary filter means 15. The perforations 17 are sized smaller than the granules of the secondary filter means 15 so that the granules cannot block the perforations 17 or pass into the interior of carrier receptacle 13. Carrier receptacle 13 can be constructed of any material having suitable strength, rigidity and corrosion-resistance properties, and is preferably made of perforated PVC pipe, although a circular cross-section is not required. Carrier receptacle 13 must have sufficient rigidity to retain its shape when buried in the secondary filter means 15. Carrier receptacle 13 extends longitudinally through housing 10 and secondary filter means 15 to optimize water flow into the secondary filter means 15. Carrier receptacle 13 is joined at one open end to ingress conduit 11 to provide a rigid structure for retaining the primary filter means 12 and means for water to flow from the basin 71 into the secondary filter means 15, and is joined at the other end to access port 14.

Figure 2:
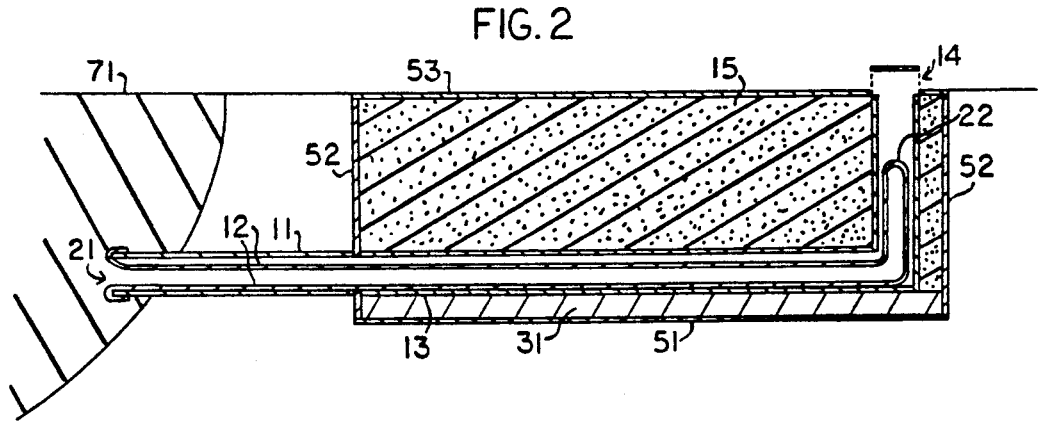
FIG. 2 is a longitudinal cross-sectional side view taken along line II—II of FIG. 1.

Primary filter means 12 is the main filter for separating the solid contaminants from the water, and the bulk of the contaminants will be removed prior to the water passing through the carrier receptacle 13 and into the secondary filter means 15. Primary filter means 12 is an extended hollow member having one open end 21 for entry of water from basin 71 and on closed end 22, as seen in FIG. 2. Primary filter 12 is constructed of any suitable filtering material which is flexible or collapsible, that is capable of being bent or flexed for removal from the carrier receptacle 13 through access port 14. Primary filter 12 is preferably constructed of a fabric material and is perforated to create openings of suitable effective openings size to allow water to pass through while trapping any solid contaminants contained in the water on the interior of the fabric. For example, primary filter means 12 can be a needle punched, nylon/polyester non-woven fabric. The effective opening size of the perforations in the primary filter 12 should be smaller than the effective opening size of the secondary filter means 15, such that the vast bulk of the solid contaminants and particulates are retained by the primary filter 12 prior to the water flowing into the secondary filter mean 15.

Figure 3:
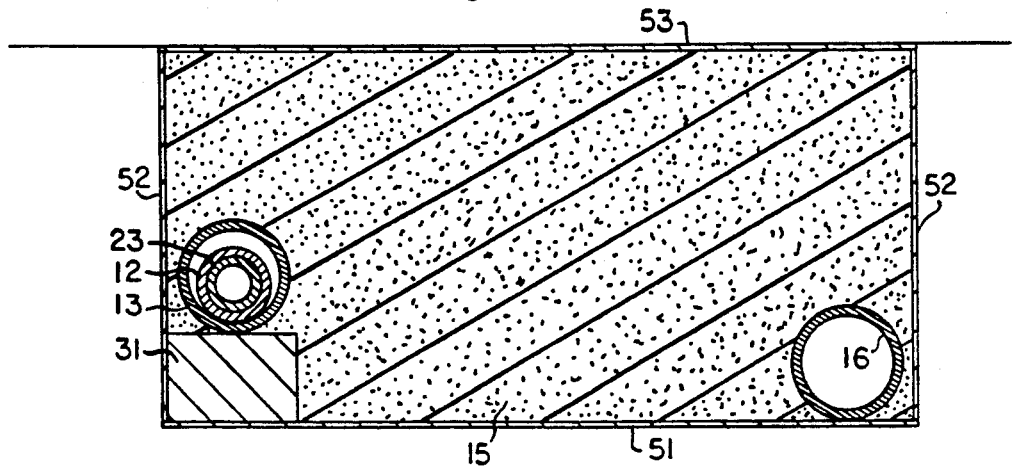
FIG. 3 is a latitudinal cross-sectional side view taken along line III—III of FIG. 1.

The primary filter means 12 is of sufficient length to extend from the basin opening of ingress conduit 11 through the length of carrier receptacle 13 and, preferably, partially into access port 14. The open end 21 of primary filter 12 is attached to the end of ingress conduit 11 at a point where it can be released and reattached when necessary. This may be accomplished, for example, by rolling the open end 21 of primary filter 12 around the exterior of ingress conduit 11 and clamping if necessary. In this manner water entering ingress conduit 11 must travel into the interior of primary filter 12, so that the water must pass through primary filter 12 to pass through carrier receptacle 13 and into secondary filter means 15. Primary filter means 12 may further comprise framework means 23 to maintain the open interior within the primary filter 12, as shown in FIG. 3, provided the framework means 23 is suitably flexible for removal through access port 14. For example, the primary filter 12 fabric may encompass a framework 23 consisting of a helical wire or perforated flexible plastic pipe.

Collection conduit 16 is positioned parallel to carrier receptacle 13 and comprises a rigid walled, perforated conduit to receive the water which has flowed through the secondary filter means 15. Since the system operates due to gravity effects, the collection conduit 16, or plural collection conduits 16 if desired, is positioned at a greater depth than the ingress conduit 11 and carrier receptacle 13, as shown in FIG. 3. Regulations typically require a minimum separation distance between the collection conduit 16 and the carrier receptacle 13 to insure that the water travels through a minimum amount of secondary filter 15. The carrier receptacle 13 may be properly positioned directly on the secondary filter means 15, but preferably a support member 31 is attached or placed on the bottom 51 of housing 10 to insure that the carrier receptacle 13 does not settle into the secondary filter means 15 over time. Collection conduit 16 is perforated or slit with openings having an effective opening size smaller than the granules of secondary filter means 15, so that water may pass into its interior but the granules may not. Collection conduit 16 extends out from housing 11 and connects the system to a storm sewer system 72 to take away the filtered water. As shown in the figures, collection conduit 16 has its opening at one end, however it is contemplated that collection conduit 16 could also be T-shaped or of any other suitable configuration, and may exit the housing 10 at any point.

Access port 14 is a vertical conduit, capped when no primary filter exchange is being done, which allows access from the ground surface to the interior of carrier receptacle 13 either through the top member 53 of housing 11 or through the secondary filter means 15. The primary filter means 12 extends to and preferably into the access port 14, so that the closed end 22 of primary filter 12 can be grasped from the surface by reaching into access port 14.

In an alternative embodiment, the invention may consist of a number of modular housing units adapted to be joined linearly, as shown in FIG. 5. Different locations may require systems of varying length, so it is desirable that the system be adjustable rather than requiring construction of different size housings 10. As shown, the modular housing units are connected end-to-end to create any housing 10 length necessary. One end housing unit 61 is adapted to receive the ingress conduit 11 and contains open-ended segments of the primary filter carrier receptacle 13 and the collection conduit 16. The other end housing unit 62 contains the access port 14 and exit means for the collection conduit 16, and likewise contains open-ended segments of the carrier receptacle 13 and collection conduit 16. Any number of internal housing units 63 contain open-ended segments of the carrier receptacle 13 and the collection conduit 16 may be placed between end housing units 61 and 62, the carrier receptacle 13 and collection conduit 16 segments being positioned so as to connect when the housing units are positioned end-to-end. For example, the housing units 61, 62 and 63 may be constructed in ten foot segments, such that the example shown in FIG. 5 would have a housing 10 forty feet in length.

As previously discussed, over time the primary filter 12 will become clogged by solid contaminants to the point of being ineffective as a filter. The invention allows for the simple removal of the primary filter 12 and its flexible framework 23 without disturbing the carrier receptacle 13 or secondary filter means 15. To accomplish this removal, the open end 21 of the primary filter 12 is disconnected from the ingress conduit 11 and a line is attached to either end. The access port 14 is uncapped and the primary filter 12 is pulled out through either the access port 14 or the ingress conduit 11 and detached from the line, which now runs through the ingress conduit 11, carrier receptacle 12 and access port 14. The primary filter 12 can then be cleaned or a substitute primary filter 12 provided. The closed end 22 of the primary filter 12 is attached to the line and inserted into the ingress conduit 11 and pulled through the carrier receptacle 13 to the access port 14. The open end 21 of the cleaned or new primary filter 12 is then attached around the exterior of ingress conduit 11 and the system is again ready for filtering. Alternatively to accomplish the same goal, the open end 21 of the new or cleaned primary filter 12 can be attached to the line at the access port 14 and pulled through the carrier receptacle 13 to the end of the ingress conduit 11, detached from the line and attached around the ingress conduit 11.

I claim:

1. A filtration system for the removal of solid particulates from water comprising:
   an ingress conduit to bring water containing solid particulates into the system;
   a collection conduit to remove said water from the system after it has been filtered;
   a primary filter means for removal of the majority of said solid particulates from said water, said primary filter means positioned between said ingress conduit and a secondary filter means, said primary filter means comprising a hollow, flexible material adapted to entrap said solid particulates while allowing said water to pass through;
   secondary filter means for additional removal of said solid particulates from said water, said secondary filter means comprising a granular material positioned between said primary filter means and said collection conduit;

a primary filter carrier receptacle containing said primary filter means and separating said primary filter means from said secondary filter means, said primary filter carrier receptacle comprising a rigid member having openings effectively sized to allow said water to pass from said primary filter means into said secondary filter means while preventing said granular material of said secondary filter means from passing through said primary filter carrier receptacle;

an access port connected to said primary filter carrier receptacle, said access port providing access to said primary filter means;

where all of said water brought into said system by said ingress conduit must pass first through said primary filter means and then through said secondary filter means; and where said primary filter means can be removed from and returned to said primary filter carrier receptacle through said access port or said ingress conduit without disturbance of said secondary filter means.

2. The system of claim 1, further comprising a housing having four walls, a bottom and a top.

3. The system of claim 1, where said collection conduit and said primary filter carrier receptacle are parallel, with said collection conduit being lower than said primary filter carrier receptacle.

4. The system of claim 1, where said secondary filter means is composed of sand.

5. The system of claim 1, where said primary filter means is an extended fabric tube having only one open end, said open end being connected to said ingress conduit.

6. The system of claim 5, where said primary filter means further comprises a flexible framework to support said fabric.

7. The system of claim 1, where said primary filter carrier receptacle and said collection conduit are composed of perforated PVC pipe.

8. The system of claim 1, where said ingress conduit extends into a water basin.

9. The system of claim 1, where said collection conduit is connected to a storm water sewer system.

10. The system of claim 1, further comprising a number of housing modules joined end-to-end, each of said housing modules containing segments of said collection conduit and said primary filter carrier receptacle.

* * * * *